United States Patent Office 3,334,123
Patented Aug. 1, 1967

3,334,123
HALOETHERSILANES
Alan L. Culpepper, Midland, Mich., assignor to Dow
Corning Corporation, Midland, Mich., a corporation of
Michigan
No Drawing. Filed Oct. 9, 1963, Ser. No. 314,879
5 Claims. (Cl. 260—448.8)

This invention relates to silanes with one haloether substituent, the quaternary ammonium salts of these silanes, and siloxane polymers that can be made from these substances. This invention also relates to the use of these substances as a new form of fabric water-repellent when used per se and when used in conjunction with other silicone water repellents.

The haloethersilanes of this invention are of the formula

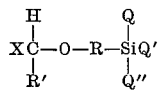

where Q, Q' and Q" can each be hydrogen, halogen, hydroxy, any monovalent hydrocarbon or halohydrocarbon radicals that are free of aliphatic unsaturation, any radical of the formulae $\overline{R}O-$, $\overline{R}COO-$, $\overline{R}_2C=N-O-$ and $\overline{R}=C=N-O-$ where $\overline{R}$ is a hydrocarbon or halohydrocarbon radical or radicals of the formula $$R''O(CH_2CH_2O)_m-$$

where R" is an alkyl radical of 1 to 4 carbon atoms, and $m$ is an integer from 1 through 2, R is a divalent aliphatic or cycloaliphatic hydrocarbon radical with more than one carbon atom, R' is hydrogen or a monovalent hydrocarbon radical with 1 through 6 carbon atoms, and X is a halogen atom.

These haloether silanes are prepared in the following manner:

where W is a monovalent unsaturated aliphatic or cycloaliphatic hydrocarbon radical. The reaction proceeds by the addition of a silicon hydride across an unsaturated carbon link, i.e.:

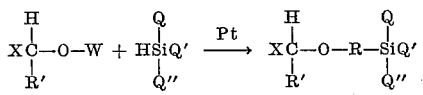

The conditions for carrying out the reaction are the standard conditions for adding SiH to C=C.

The appropriate haloether can be prepared for use in the above reaction by the following method:

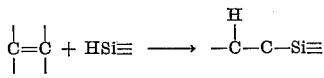

This is a standard synthesis, being described in "Organic Synthesis," vol. 1, second edition, p. 377 (1944).

If any or all of the substituents on the silane represented by Q, Q', and Q" are hydrolyzable groups such as hydrogen, alkoxy, acyloxy, phenoxy, or Ketoxime, the haloether silanes can then be polymerized to siloxanes by standard hydrolysis methods well-known to the art, or copolymerized with other silanes by the same methods. Since alpha-haloethers are themselves reactive towards water, it is best to employ only that amount of water needed to hydrolyze the silicon-bonded hydrolyzable groups. Alternatively, the haloether silanes can be reacted with a hydroxyl-endblocked preformed copolymer, forming copolymers through an anhydrous reaction.

Such haloether siloxane polymers and copolymers are represented by the following: a siloxane with at least one unit of the Formula 1:

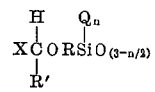

where $n$ is an integer of 0 through 2 and the other symbols are as shown above, any other units in the siloxane being of the Formula 2:

$$Y_aSiO_{(4-a/2)}$$

where $a$ is an integer of 0 through 3, and Y is hydrogen, any monovalent hydrocarbon or halohydrocarbon radical, any radical of the formulae $\overline{R}O-$, $\overline{R}COO-$, $\overline{R}_2C=N-O-$, $\overline{R}=C=N-O-$ or $R''O(CH_2CH_2O)_m-$ as defined supra, or hydroxy radicals. The copolymers of this invention can contain more than one species each of (1) and (2).

A quaternary ammonium salt can be made from the haloether silanes of this invention by the following reaction:

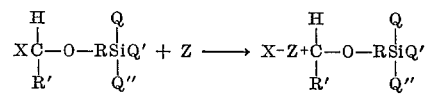

where Z is a tertiary amine containing no more than one aromatic group, and the other symbols are as defined above.

This invention also relates to siloxane polymers or copolymers containing quaternary ammonium salt substituted siloxane units of the formula:

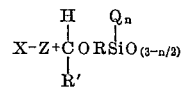

where the symbols are as defined above, any other units in the siloxane being of the formula $$Y_aSiO_{(4-a/2)}$$

where the symbols are as defined above.

These siloxane polymers and copolymers can be prepared by hydrolyzing or cohydrolyzing the corresponding silanes.

The preferred method of making these siloxanes is to react the tertiary amine (Z) with the corresponding haloether siloxane homopolymer or copolymer. When more than one haloether group is present in the original siloxane, more than one quaternary ammonium salt group can be present in the polymer molecule.

The compositions of this invention can be used for rendering substrates water repellent. This utility is exhibited in two ways. First, the silanes and siloxanes can be used to increase the durability of conventional siloxane water repellents. Second, some of the siloxane copolymers described infra can be used per se as water repellents. In all cases the treatment is particularly applicable to cellulosic fabrics.

It is believed that in both cases the mechanism for improved water repellency involves a bonding of the quaternary ammonium salt or the haloether group to hydroxyl groups on the fabric surface in, for example, the following manner:

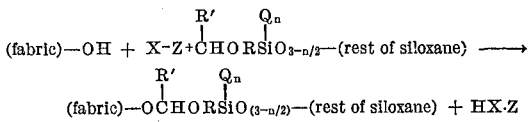

As stated above, either silanes or siloxanes can be used. When the hydrolyzable silanes are employed in aqueous medium they will, of course, generate the corresponding siloxane in situ.

When the haloethers are employed one must take care to neutralize the by-produced acid. This can be done by washing the substrate with mild alkali such as alkali metal acetates or ammonium. The purpose of this is to avoid deterioration of the substrate.

When the silanes and siloxanes of this invention are employed to improve the durability of conventional siloxanes, they can be applied to the substrate either before, in conjunction with or subsequent to the conventional siloxane. The precise ratio of the instant compounds relative to the conventional siloxane is not critical although, in general, the haloethers and quaternary ammonium compounds of this invention should constitute less than 50 weight percent of the total organosilicon composition. Preferably, the compositions of this invention are employed in amounts of from 1 to 5 percent based on the weight of the conventional siloxane.

Conventional siloxanes which can be employed along with the compositions of this invention are, for example, aliphatic hydrocarbon and haloaliphatic hydrocarbon substituted siloxanes such as methylhydrogensiloxane, dimethylsiloxane, methylethylsiloxane, methylvinylsiloxane, octadecylmethylsiloxane, and copolymers or mixtures of these and polymers of such siloxanes containing end-blocking groups such as trimethylsiloxane, dimethylhydrogensiloxane and dimethylvinylsiloxane and copolymers containing monoorganosiloxanes such as monomethylsiloxane, monoethylsiloxane and monooctadecylsiloxane. Examples of haloaliphatic siloxanes are heptafluoropentylmethylsiloxane, mono(pentadecylfluorononyl) siloxane and heptafluoropentylhydrogensiloxane.

It is generally desirable to employ a curing catalyst in conjunction with these conventinal siloxanes such as those commonly employed in curing siloxanes on substrates. Examples of such catalysts are metal salts of carboxylic acids such as dibutyltin diacetate, dibutyltin dilaurate or zinc octoate or alkanol amine titanates such as triethanol amine titanate.

As stated above, certain copolymers of this invention can be used per se as water repellents. These are copolymers in which the haloethersiloxane and/or quaternary ammonium salt siloxane units composed from .5 to 50 mol percent of the siloxane and the remainder of the copolymer being essentially of units of the formula

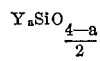

It is preferred that Y be methyl. The best water repellency is generally attained when the mol percent of the haloether or ammonium salt units in the copolymer is from 1 to 30 mol percent. These copolymers can be applied to the substrate in the form of emulsions or solutions or in any other suitable form.

In both kinds of treatment shown above the amount of siloxane water repellent on the substrate is not critical although, in general, the pick-up runs from 0.1 to 2 percent based on the weight of the substrate. It is desirable that the pick-up should be at least 0.4 percent.

The following is a list of typical species that the various symbols used in this disclosure represent.

Q, Q' and Q'' can be, among others, any of the following groups: hydrogen, methyl, octadecyl, ethyl, 2-methylpropyl, cyclohexyl, phenyl, 3-methylbenzyl, tolyl, 2-phenylpropyl, chloromethyl, trifluoropropyl, 2,4-dibromocyclohexyl, 2 - chlorophenyl, 2-trifluoromethyl-3,3,3-trifluoropropyl, methoxy, ethoxy, 2-chloroethoxy, octadecoxy, cyclohexoxy, 4 - chlorocyclohexoxy, 2 - methylpropoxy, acetate, propionate, nonadecanoate, isovalerate, cyclohexanecarboxylate, benzoate, crotonate, chloroacetate, 3 - trifluoromethyl-4,4,4-trifluorobutyrate, p-bromobenzoate, 4-chlorocrotonate, phenoxy, chloride, bromide, methylethylisocyanoxy, phenylethylisocyanoxy, cyclohexyl 2-methylvinylisocyanoxy, 4-methylcyclohexyl isocyanoxy, bis-3-chloropropyl isocyanoxy, bis-3-chloropropyl isocyanoxy, bis-trifluoromethyl isocyanoxy, beta-methoxyethoxy, beta-butoxyethoxy, gamma-methoxy-beta-ethoxyethoxy, hydroxy, etc.

R can be any divalent aliphatic or cycloaliphatic hydrocarbon radical of more than one carbon atom such as: ethylene, trimethylene, 2-methyltrimethylene, octadecamethylene, 1,4 - cyclohexylene, 1,4 - cyclohexenylene-1, butenenylene-1.

R' is hydrogen or any monovalent hydrocarbon radical of six carbon atoms or less including methyl, ethyl, 2-methylpropyl, hexyl, cyclohexyl, phenyl, 2-butenyl, etc.

X is a halogen atom, F, Cl, Br. or I.

Y can be, for example, any of the following groups:

hydrogen,
methyl,
octadecyl,
ethyl,
2-methylpropyl,
cyclohexyl,
phenyl,
3-methylbenzyl,
xenyl,
butadienyl,
2-methylpropenyl-2,
ethynyl,
cyclohexenyl-2,
chloromethyl,
trifluoropropyl,
2,4-dibromocyclohexyl,
2-chlorophenyl,
2-trifluoromethyl-3,3,3-trifluoropropyl,
2-tribromomethyl,
3,3-dibromopropenyl-2,
chloroethynyl,
methoxy,
ethoxy,
octadecoxy,
cyclohexoxy,
2-methylpropoxy,
acetate,
propionate,
nonadecanoate,
3-methylbutyrate,
cyclohexanecarboxylate,
benzoate,
crotonate,
chloroacetate,
3-trifluoromethyl-4,4,4-trifluorobutyrate,
p-bromobenzoate,
4,4,4-trifluoro-2,3-chlorocrotonate,
phenoxy,
chloride,
bromide,
methylethylisocyanoxy,
phenylethyl isocyanoxy,
2-methylvinylcyclohexyl isocyanoxy,
hydroxy, etc.

Z is any tertiary amine radical containing no more than one aromatic group such as: pyridine, 2-picoline, triethylamine, dimethylphenylamine, methylvinylcyclohexylamine, cyclohexenyl 2,2-methylpropyl m-diethylphenylamine, etc.

The following examples are illustrative only and should not be construed as limiting the invention which is properly delineated in the appended claims.

*Example 1*

Chloromethylallyl ether (ClCH$_2$OCH$_2$CH=CH$_2$) was prepared by the method of Shoemaker and Boord [J. Am. Chem. Soc. 53, 1505, (1931)]. In a large separatory funnel suspended in an ice bath was placed 290 g. (5.0 moles) of allyl alcohol and 150 g. (5.0 moles) of p-formaldehyde. Anhydrous hydrochloric acid was added below the surface of the liquid until the solution was clear (about 4 hours). The water layer was removed and the product layer dried. Excess acid was removed by passing dry nitrogen through the solution for one hour. A total of 337 g. (63.5% yield) of chloromethylallyl ether was obtained.

In a one liter flask fitted with a stirrer, condenser, thermometer, and addition funnel was placed 175.2 g. (1.65 moles) of chloromethylallyl ether and 1.5 ml. of 0.1 M chloroplatinic acid in isopropanol. The contens of the flask were heated to 80° C. and maintained at this temperature while 184 g. (1.6 moles) of methyl hydrogen dichlorosilane was added over a period of 6 hours. The product was distilled to yield 229.1 g. (64% yield) of 3-chloromethoxypropyldichloromethylsilane

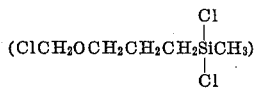

Example 2

In a 100 cc. flask fitted with a stirrer, condenser, and addition funnel was placed 22.1 g. (0.1 mol) of 3-chloromethoxypropyldichloromethylsilane in 25 ml. of benzene. The flask was cooled with ice and 1.8 g. (0.1 mol) of water was added dropwise. When the addition was complete the solution was stirred for one hour and then dried with Drierite. The solvent was removed under vacuum to give 16.0 g. (96.5%) of a viscous liquid, the siloxane homopolymer of

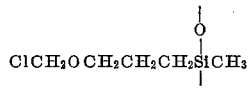

Example 3

When a mixture of 2.5 moles of 3-chloromethoxypropyldichloromethylsilane, 2.5 mols of methyloctadecyldichlorosilane, and 5.0 mols of dimethyldichlorosilane is hydrolyzed (as in Example 2), a viscous copolymer is obtained that consists of 25 mol percent

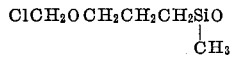

units, 25 mol percent

units and 50 mol percent $(CH_3)_2SiO$ units.

Example 4

When a mixture of 1.5 mols of 3-chloromethoxypropyldichloromethylsilane, 0.5 mol of methyldichlorosilane, and 8 mols of dimethyldichlorosilane is hydrolyzed (as in Example 2), a viscous copolymer is obtained consisting of 15 mol percent

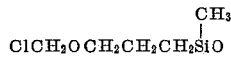

units, 5 mol percent of

units and 80 mol percent $(CH_3)_2SiO$ units.

Example 5

When a mixture of 1 mol of 3-chloromethoxypropyldichloromethylsilane, 6 mols of methyldichlorosilane, and 3 mols of dimethyldichlorosilane is hydrolyzed (as in Example 2), a viscous copolymer is obtained consisting of 60 mol percent of

units, 30 mol percent of $(CH_3)_2SiO$ units, and 10 mol percent of

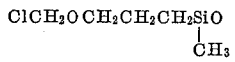

units.

Example 6

When 1 mol of 3-chloromethoxypropylidchloromethylsilane is mixed with 1 mol of pyridine, a quaternary ammonium salt is obtained of the following formula:

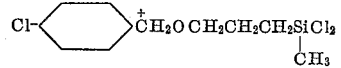

Example 7

In a 500 cc. flask fitted with a stirrer, condenser, thermometer, and addition funnel was placed 106.5 g. of chloromethyl allyl ether and 0.3 ml. of 0.1 M chloroplatinic acid in isopropanol. The contents of the flask were heated to 80° C. and maintained at this temperature while 135.5 g. of trichlorosilane was added over a period of three hours. The product was distilled through a 24 cm. Vigreaux column to yiled 44.6 g. of 3-chloromethoxypropyltrichlorosilane.

12.1 g. of 3-chloromethoxypropyltrichlorosilane and 20 ml. of ethyl ether was placed in a small separatory funnel, which was then cooled with ice. 1.35 g. of water was added, and the solution was allowed to stand for one hour. The ether was removed by distillation under vacuum to give 5.4 g. of poly(3-chloromethoxypropyl)siloxane.

Example 8

When pyridine is added to 3-chloromethoxytrichlorosilane the pyridinium salt is formed:

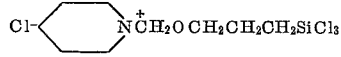

Example 9

A mixture of 0.1 mol of 3-chloromethoxypropylidichloromethylsilane, 0.375 mol of dimethyldichlorosilane, 0.025 mol of methyltrichlorosilane, and 100 cc. of benzene was rapidly stirred while 9.3 g. of water was added over a period of two hours. Stirring was continued for an additional two hours before excess water was removed by azeotropic distillation. The benzene was removed under vacuum, and the residue was heated to 80° C. at 2 mm. pressure. A total of 42.3 g. (92% yield) of faintly yellow fluid was obtained which was a copolymer of 20 mol percent 3-chloromethoxypropyl(methyl)siloxane, 75 mol percent dimethylsiloxane and 5 mol percent monomethylsiloxane. Ten g. of this copolymer was dissolved in 13.4 g. of pyridine. A product was obtained that is soluble in water and was a copolymer of 20 mol percent

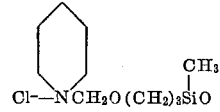

75 mol percent $(CH_3)_2SiO$ and 5 mol percent $CH_3SiO_{3/2}$.

When a water solution of this product was applied to cotton fabric, and the fabric was dried, the fabric was thereafter found to have water-repellent properties.

Example 10

Cotton fabric was treated with a solution of a copolymer consisting of 90 percent $(CH_3)_2Si(O)$ units and 10 percent

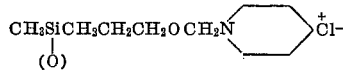

units. The fabric was then treated with a commercial silicone textile emulsion. Good water-repellent characteristics were exhibited by the fabric.

*Example 11*

Copolymers consisting of dimethylsiloxane units and

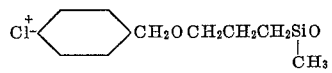

units in varying proportions were made by cohydrolysis of the corresponding chlorosilanes by the method of Example 2. Cotton cloth was treated with 2 percent water solutions of these copolymers, dried, and cured for two minutes at 350° F. The durability was determined by washing at 160° F. in a Najort reversing wheel washer.

| Mol percent $(CH_3)_2SiO$ in copolymer | Spray ratings after number of 160° F. washings | | | |
|---|---|---|---|---|
| | 0 | 1 | 2 | 3 |
| 50 | 50 | 50 | 50 | 50 |
| 60 | 70 | 70 | 70 | 70 |
| 80 | 90 | 90 | 80 | 80 |
| 90 | 90 | 90 | 90 | 80 |
| 98 [1] | 100 | 80 | 80 | 70 |

[1] A benzene solution of this copolymer was used to apply the copolymer to the cloth.

*Example 12*

Cotton print cloth was treated with the following mixtures: 92.725% of water, 6.6% of a 30% water emulsion of 80% methyl hydrogen siloxane and 20% dimethylsiloxane with OH endblocks, 0.6% of a curing catalyst containing octylene glycol titanate and zinc nitrate, and 0.075% of a copolymer consisting of dimethylsiloxane units and

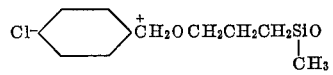

units in varying proportions.

The cloth was immersed in the mixture and then run through a "paddler" to give a wringing action at a uniform pressure, in order to assure a uniform pick-up of siloxane, and then dried. The water repellency is as follows:

| Mol percent $(CH_3)_2SiO$ in copolymer | Spray ratings number of 160° F. washings | | |
|---|---|---|---|
| | 0 | 1 | 3 |
| 50 | 100 | 70 | 70 |
| 60 | 90 | 70 | 70 |
| 80 | 90 | 70 | 70 |
| 90 | 90 | 80 | 80 |
| Control (no copolymer in treating mixture) | 100 | 50 | 50 |

*Example 13*

When the following reactants are reacted in accordance with Example 1, the following products are obtained:

(a)
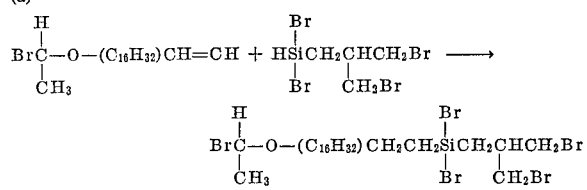

(b)
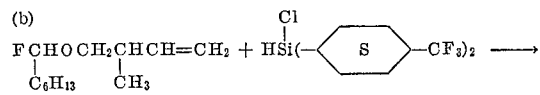

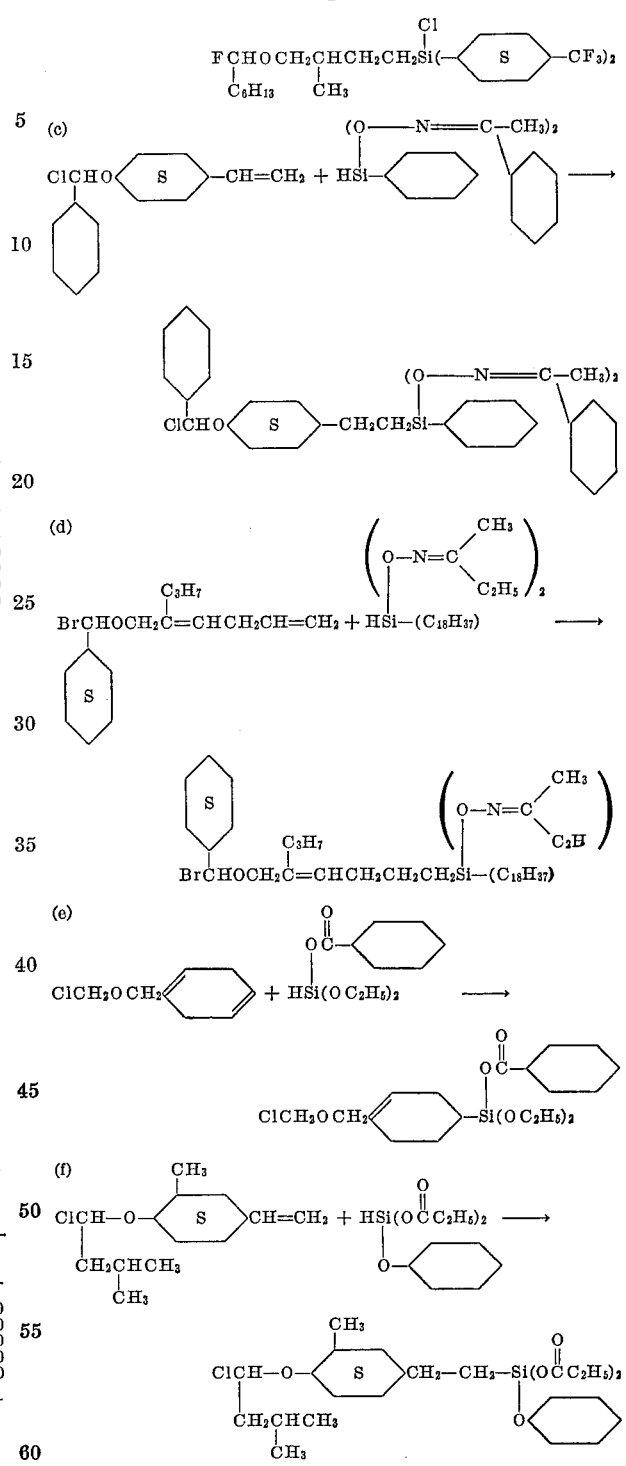

*Example 14*

When the haloether silanes of Example 11 are cohydrolyzed and copolymerized with the following silanes in accordance with Example 3, the haloether siloxane copolymers shown below are obtained. When these haloether copolymers are then reacted with the following tertiary amines in accordance with the procedure of Example 6, the following quaternary ammonium salts are obtained.

(a) 2 mols of the product of 11(a), 0.1 mol of ethylisopropyldichlorosilane, the product is reacted with 2.1 mols of alpha-picoline.

(b) 0.1 mol of the product of 11(b), 5 mols of phenylcyclohexyl-bis(ethylphenylisocyanoxy)silane, the product of which is added to .2 mol of triethylamine in benzene.

(c) 0.1 mol of product 11(c), 2 mols of bis-m-tolyl-methylchlorosilane, the product of which is added to phenyldimethylamine.

(d) 0.5 mol of product 11(d), 1 mol of butadienyl-methyldiacetoxysilane, the product of which is added to 2.5 mols of cyclohexylvinylmethylamine.

(e) 1 mol of product 11(e), 1 mol of 3,3,3-(trifluoropropyl)-p-chlorophenyldiethoxysilane, the product of which is added to 2 mols of cyclohexenylisopropyl-m-(diethylphenyl)-amine.

(f) 0.8 mol of product 11(f), 0.2 mol of ethylsilicate and 1 mol of vinylmethyldiethoxysilane, the product of which is added to 1 mol of N-methylpiperidine.

| | Haloether siloxane copolymers | Mol percent |
|---|---|---|
| (a) | $BrCO(C_{18}H_{36})SiCH_2CHCH_2Br$ with H, CH₃, CH₂Br substituents | 9.1 |
| | Isopropylethylsiloxane | 90.9 |
| (b) | $FCHOCH_2CHCH_2CH_2Si(\text{—S—}C_6H_4\text{—}CF_3)_2 O_{1/2}$ with $C_6H_{13}$, $CH_3$ | 2.0 |
| | Phenylcyclohexylsiloxane | 98.0 |
| (c) | $ClCHO\text{—}C_6H_4\text{—}S\text{—}C_6H_4\text{—}CH_2CH_2SiO$ with cyclohexyl | 4.8 |
| | Bis(m-tolyl)methylsiloxane | 95.2 |
| (d) | $BrCHOCH_2C(C_3H_7)=CH(CH_2)_3SiC_{18}H_{37}$ with O | 33.3 |
| | Butadienylmethylsiloxane | 66.7 |
| (e) | $ClCH_2OCH_2\text{—}C_6H_4\text{—}SiO_{3/2}$ | 50.0 |
| | (3,3,3-trifluoropropyl)p-chlorophenylsiloxane | 50.0 |
| (f) | $ClCHO\text{—}S\text{—}CH_2CH_2SiO_{3/2}$ with $CH_3$, $CH_2CHCH_3$, $CH_3$ | 40.0 |
| | $SiO_2$ | 10.0 |
| | Vinylmethylsiloxane | 50.0 |

| | Quaternary ammonium salt copolymers | Mol percent |
|---|---|---|
| (a) | $Br^-\text{—}C_6H_4\text{—}N(CH_3)(CH_3)\text{—}CHO(C_{18}H_{36})SiCH_2CHCH_2Br$ with $CH_2Br$ | 9.1 |
| | Isopropylethylsiloxane | 90.9 |
| (b) | $F^-{}^+(C_2H_5)_3NCHOCH_2CHCH_2CH_2SiO_{1/2}$ with $C_6H_{13}$, $CH_3$, $[C_6H_4 CF_3]_2$ | 2.0 |
| | Cyclohexylphenylsiloxane | 98.0 |
| (c) | $Cl^-{}^+(CH_3)_2NCHO\text{—}S\text{—}CH_2CH_2SiO$ | 4.8 |

| Haloether siloxane copolymers | Mol percent |
|---|---|
| Bis(m-tolyl)methylsiloxane | 95.2 |
| (d) Br⁻ ⁺CH₂=CHN(S)(S)(CH₃)—CHOCH₂$\overset{C_3H_7}{\underset{C_{18}H_{37}}{C}}$CH(CH₃)₃SiO | 33.3 |
| Butadienylmethylsiloxane | 66.7 |
| (e) Cl⁻ ⁺(CH₃)₂CHNCH₂OCH₂(ring)SiO₃/₂, with C₂H₅, C₂H₅ substituents | 50.0 |
| (3,3,3-trifluoropropyl)p-chlorophenylsiloxane | 50.0 |
| (f) Cl⁻ ⁺(S-ring with CH₃)N—CHO(S-ring with CH₃)CH₂CH₂SiO₃/₂, CH₂CHCH₃/CH₃ | 40.0 |
| SiO₂ | 10.0 |
| Vinylmethylsiloxane | 50.0 |

Example 15

When chloromethoxyallyl ether is added to the following silanes in accordance with the procedure of Example 1, the following products are obtained. When these silanes are then partially hydrolyzed by reacting with less than enough water to react with all the silicon-bonded hydrolyzable groups, siloxanes having the following average formulae are obtained.

| | Silane | Products |
|---|---|---|
| (1) | HSi(OCH₂CH₂Cl)₃ | ClCH₂O(CH₂)₃Si(OCH₂CH₂Cl)₃ |
| (2) | HSi[ON=C(CF₃)₂]₃ | ClCH₂O(CH₂)₃Si[ON=C—(CF₃)₂]₃ |
| (3) | H$\overset{CH_3}{\underset{}{Si}}$(O-ring-I)₂ | ClCH₂O(CH₂)₃$\overset{CH_3}{\underset{}{Si}}$[O-ring-I]₂ |
| (4) | HSi[OOCCH₂CH₂Cl]₃ | ClCH₂O(CH₂)₃Si[OOCCH₂CH₂Cl]₃ |
| (5) | HSi[ON=C̄(CH₂)₅]₃ | ClCH₂O(CH₂)₃Si[ON=C̄(CH₂)₅]₃ |

| | Siloxanes |
|---|---|
| (1) | ClCH₂O(CH₂)₃Si(O₁/₂)[OCH₂CH₂Cl]₂ |
| (2) | ClCH₂O(CH₂)₃Si(O)—O—N=C(CF₃)₂ |
| (3) | ClCH₂O(CH₂)₃$\overset{CH_3}{\underset{}{Si}}$[O-ring-I]₁.₀₅ |
| (4) | ClCH₂O(CH₂)₃Si(O)OOCCH₂CH₂Cl |
| (5) | ClCH₂O(CH₂)₃Si(O)ON=C̄(CH₂)₅ |

Example 16

When gamma-chloromethoxypropyltrimethoxysilane is reacted with benzyldimethylamine the silane

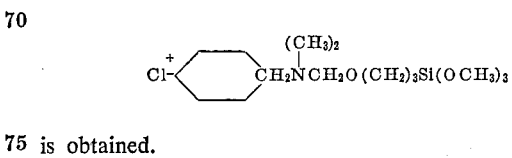

is obtained.

Example 17

When chloromethylallyl ether is reacted with the following silanes, the following haloethers are obtained, which when reacted with pyridine give the following quaternary salts.

| Silane | Haloether | Quaternary Salt |
|---|---|---|
| $HSi(OCH_2CH_2OCH_3)_3$ | $ClCH_2O(CH_2)_3Si(OCH_2CH_2OCH_3)_3$ | $Cl^{-+}\langle\phantom{x}\rangle NCH_2O(CH_2)_3Si(OCH_2CH_2OCH_3)_3$ |
| $HSi[(OCH_2CH_2)_2OC_4H_9]_3$ | $ClCH_2O(CH_2)_3Si[(OCH_2CH_2)_2OC_4H_9]_3$ | $Cl^{-+}\langle\phantom{x}\rangle NCH_2O(CH_2)_3Si[(OCH_2CH_2)_2OC_4H_9]_3$ |

Example 18

To 2000 g. of methylenechloride was added 1022 g. of a dimethylsiloxane polymer with hydroxyl endblocking groups, and 420 g. of $$ClCH_2OCH_2CH_2CH_2\underset{\underset{CH_3}{|}}{Si}Cl_2$$

the latter ingredient being added over a period of 20 minutes. The reaction mixture was refluxed until HCl ceased to evolve, the methylene chloride was distilled off, and the product was vacuum-stripped. The residue was a siloxane copolymer of the dimethylsiloxane and the chloromethylallyl ether silane.

To 500 g. of this residue was added 300 g. of pyridine and 278 g. of water. Then additional water was added to make a 40 percent solution.

4.4 g. of this mixture was mixed with 0.85 g. of sodium acetate and 94.7 g. of water was added.

Cotton cloth was soaked in this latter mixture and then run through a paddler and dried. The ratio of the weight of solid on the cloth to the cloth itself was 1.6 percent.

This cloth was found to have an initial water repellency spray rating of 90 to 100. After one washing the fabric had a spray rating of 90. After three washings the fabric had a spray rating of 80. After five washings the fabric had a spray rating of 80.

That which is claimed is:

1. As a composition of matter, a compound of the formula $$X-\underset{\underset{R'}{|}}{\overset{\overset{H}{|}}{C}}-O-R-\underset{\underset{Q''}{|}}{\overset{\overset{Q}{|}}{Si}}Q'$$

where

Q, Q' and Q'' are each selected from the group consisting of hydrogen, halogen, hydroxy, monovalent hydrocarbon and halohydrocarbon radicals that are free of aliphatic unsaturation, and radicals of the formulae selected from the group consisting of $\overline{R}O-$, $\overline{R}COO-$, $\overline{R}_2C=N-O-$, $\overline{R}=C=N-O$ and $R''O(CH_2CH_2O)_m-$ where $\overline{R}$ is selected from the group consisting of hydrocarbon and halohydrocarbon radicals, $R''$ is an alkyl radical of 1 through 4 carbon atoms, and $m$ is 1 through 2, R is selected from the group consisting of divalent aliphatic and cycloaliphatic hydrocarbon radicals of more than one carbon atom, R' is selected from the group consisting of hydrogen and monovalent hydrocarbon radicals with 1 through 6 carbon atoms, and X is a halogen atom.

2. As a composition of matter, a compound of the formula $ClCH_2OCH_2CH_2CH_2Si(OCH_3)_3$.

3. As a composition of matter, a compound of the formula $$ClCH_2OCH_2CH_2CH_2\underset{\underset{CH_3}{|}}{Si}Cl_2$$

4. As a composition of matter, a compound of the formula $$BrCH_2OCH_2CH_2CH_2\underset{\underset{Br}{|}}{Si}(CH_3)_2$$

5. As a composition of matter, a compound of the formula $ClCH_2OCH_2CH_2CH_2Si(Cl)_3$.

References Cited

UNITED STATES PATENTS

| | | | |
|---|---|---|---|
| 3,040,080 | 6/1962 | Kopnick et al. | 260—448.8 |
| 3,094,497 | 6/1963 | Hyde | 260—448.8 |
| 3,160,647 | 12/1964 | Chappelow et al. | 260—448.8 |
| 3,170,894 | 2/1965 | Brown et al. | 260—46.5 |
| 3,186,963 | 6/1965 | Lewis et al. | 260—46.5 |

TOBIAS E. LEVOW, *Primary Examiner.*

LEON J. BERCOVITZ, *Examiner.*

M. I. MARQUIS, P. F. SHAVER, *Assistant Examiners.*